United States Patent Office 3,032,500
Patented May 1, 1962

3,032,500
SEQUESTRATION OF METAL IONS
John E. Milks, Stamford, Vernon P. Wystrach, Noroton Heights, and Frederick H. Siegele, Westport, Conn., assignors to American Cyanamid Company, New York, N.Y., a corporation of Maine
No Drawing. Filed Dec. 31, 1959, Ser. No. 863,063
9 Claims. (Cl. 252—8.55)

This invention relates to methods for sequestering or inhibiting the precipitation of metal ions from aqueous solutions containing same and has for its principal object the provision of a novel class of sequestering agents for this purpose. A further object is the provision of novel sequestering agents that are particularly effective within the pH range of about 6 to about 11. A further particular object is the provision of iron sequestering agents that are particularly effective within the pH range wherein ferric hydroxide is strongly precipitated; i.e., from a pH of about 6 to about 11. A still further particular object is the provision of subterranean flooding processes wherein the novel sequestrants are employed to prevent plugging of the subterranean channels and pores by iron deposits, and the like. Still further objects will become apparent from the following description of the invention when taken with the appended claims.

It has been found that the 1-carboxy-1-hydroxy aliphatic phosphonic acids and their water-soluble salts are good sequestrants in acidic, neutral and alkaline aqueous solutions; when added to such solutions they prevent the precipitation, for example, of iron as ferric or ferrous hydroxide, probably by forming complexes. They exhibit their highest sequestering efficiency for iron in the pH range from about 6 to about 11; that is to say, a given concentration of the phosphonic acid compounds will sequester and prevent the precipitation of a larger quantity of iron in this range than under more strongly acid conditions. The importance of this fact is, of course, that iron hydroxide formation and deposition are usually most troublesome under neutral or alkaline conditions; therefore, the new sequestrants are most efficient in the particular range where they are most needed.

The phosphonic acids used in practicing the invention are described accurately by the formula

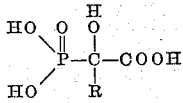

in which R is the residue of an alpha-ketocarboxylic acid and is therefore hydrogen or any suitable hydrocarbon radical. The most common alpha-ketocarboxylic acids are those of the fatty acid series, in which R is hydrogen or a saturated or unsaturated hydrocarbon radical of from one to about 20 carbon atoms, and the keto dicarboxylic acids, such as the ketosuccinic acids, including oxalacetic acid itself, ketoglutaric acid, and the like.

The saturated alpha-keto(aliphatic)monocarboxylic acids of the series from glyoxylic acid (HCO.COOH) to alpha-ketostearic acid are the most common and constitute the preferred starting materials to be used in preparing the phosphonic acid sequestrants of the instant invention. Many of the 1-carboxy-1-hydroxy-alkylphosphonic acids prepared from these ketoaliphatic acids are new chemical compounds, and therefore their preparation is described in detail in the following examples. 1-carboxy-1-hydroxyethylphosphonic and 1-carboxy-1-hydroxymethylphosphonic acids are the preferred sequestrants to be used in practicing the invention since, by reason of their relative cheapness and ease of preparation as well as their low molecular weights, they constitute inexpensive and highly efficient iron sequestrants.

The 1-carboxy-1-hydroxy aliphatic phosphonic acids are prepared from the corresponding alpha-ketoaliphatic carboxylic acids by reacting these either with phosphorus trichloride or with phosphorous acid or a water-soluble salt thereof, such as an alkali metal salt. The novel sequestrants are obtained by reacting together equimolecular quantities of the alpha-ketoaliphatic carboxylic acid and the phosphorus compound, but preferably a slight excess, such as a 5%–15% excess, over the theoretical quantity of phosphorus compound is employed.

When $PCl_3$ is used it is condensed with the ketoaliphatic acid by simple admixture, preferably with cooling, to avoid temperatures above 35° C. The condensation takes place with evolution of gaseous hydrochloric acid and may advantageously be carried out in the presence of an acidic diluent, such as acetic acid, if desired. When the condensation is complete the mixture is poured into water and hydrolyzed to form the desired 1-carboxy-1-hydroxy alkylphosphonic acid which may be recovered by evaporating the solution to dryness.

The sequestrants are likewise obtainable by reacting alpha-ketoaliphatic carboxylic acids or their esters with phosphorous acid. They are also obtainable by reacting the alpha-ketoaliphatic carboxylic acids with alkali metal phosphites, such as $Na_2HPO_3$, whereupon the corresponding alkali metal salts of the 1-carboxy-1-hydroxy aliphatic phosphonic acids are obtained directly. It will be understood that these alkali metal salts, as well as other water-soluble salts, may be added directly to aqueous metal-ion-containing media as combined nuetralizing and sequestering agents.

Representative sequestrants that can be prepared by these methods and used in practicing the process of the invention are, in addition to those mentioned above, 1-carboxy-1-hydroxypropylphosphonic acid, 1-carboxy-1-hydroxybutylphosphonic acid, 1-carboxy-1-hydroxyisobutylphosphonic acid, 1-carboxy-1-hydroxycaprylphosphonic acid, and the corresponding compounds of the olefin monocarboxylic acid series, such as 1-carboxy-1-hydroxyethenylphosphonic acid, 1-carboxy-1-hydroxy-2-propenylphosphonic acid, and their sodium, potassium and ammonium salts.

The process of the present invention is practiced simply by incorporating suitable quantities of the 1-carboxy-1-hydroxyaliphatic phosphonic acids into the water or other aqueous liquid to be protected against metal ion precipitation. As has been indicated above, these sequestrants function most efficiently when the aqueous liquid has a pH between 6 and about 11; however, larger quantities will work satisfactorily at lower pH values. Ordinarily one gram atom of the sequestrant will solubilize three gram atoms of ferric iron, for instance, and therefore the invention can be practiced by adding one-third of a gram mol of the 1-carboxy-1-hydroxy aliphatic phosphonic acid or its water-soluble salt, such as an alkali metal or ammonium salt, for each gram atom of iron or the like present in the solution.

Although the novel sequestering agents of the invention are of general utility wherever it is desired to prevent the precipitation of the hydroxides or sulfides of metals, such as iron hydroxide, iron sulfide, or the like, they are of especial importance in subterranean water-flooding operations, such as those used for the secondary recovery of petroleum.

It is well known that the quantity of oil that can be recovered from a well drilled into an oil-bearing formation can be increased by forcing an aqueous flooding liquid through the formation toward an output well located therein. Ordinarily a flooding liquid, which may be water or may contain other solutes, such as viscosity-increasing agents, such as sugars, polyacrylamides, and the like, is introduced into the formation through several input wells located around each production well. The presence of dissolved iron, for example, in such flooding liquids creates a particularly troublesome difficulty because it is apt to precipitate by contact with limestone or other alkaline strata and cause plugging of the formation, thus actually reducing the quantity of petroleum that can be recovered. When this feature of the invention is practiced small quantities on the order of about ⅓ to 1 mol of a 1-carboxy-1-hydroxyaliphatic phosphonic acid or its alkali metal salt for each atom of dissolved iron is added to the flood water, thus preventing such iron precipitation.

The invention will be further described and illustrated by the following specific examples which set forth preferred embodiments thereof. It will be understood, however, that the invention in its broader aspects is not limited by these examples, and that modifications and substitutions of equivalents may be restorted to within the scope of the appended claims.

EXAMPLE I

A reaction flask immersed in a water bath is charged with 88 grams (1 mol) of pyruvic acid and phosphorus trichloride is added with agitation while maintaining the temperature below 35° C. A total of 145 grams of PCl₃ is added, after which the agitation is continued for about 2–3 hours until the evolution of HCl is complete. There is then added 180 grams of glacial acetic acid and the mixture is maintained at about 20° C.–30° C. for an additional 12 hours. It is then poured into ice water and agitated until hydrolysis is complete, after which the water is evaporated on a steam bath. The resulting oily product is recrystallized from glacial acetic acid, whereupon 1-carboxy-1-hydroxyethylphosphonic acid is obtained in the form of water-soluble crystals.

This compound is dissolved in water to a concentration of 10 parts per million. A water solution of ferric chloride is then added followed by sufficient alkali to maintain the pH at 7.0. It is found that the 1-carboxy-1-hydroxyethylphosphonic acid sequesters and prevents the precipitation of its own weight of iron, whereas an untreated sample of water develops a precipitate of ferric hydroxide upon the first addition of ferric chloride and alkali.

EXAMPLE II

A sample of the 1-carboxy-1-hydroxyethylphosphonic acid of Example I is dissolved in water and neutralized by adding sodium hydroxide. Upon evaporation of the solution to dryness the disodium salt is obtained as a hygroscopic solid.

Another sample of the same acid is dissolved in water and sufficient sodium hydroxide is added to bring the pH to 9.8. Upon evaporation of the solution the trisodium salt is obtained.

These salts are added to samples of water containing dissolved ferric iron which are then adjusted to pH values of 6.0, 7.0, 8.0, 10.0 and 11.0 by the addition of sodium hydroxide. It is found that the 1-carboxy-1-hydroxyethylphosphonic acid functions as an iron sequestrant throughout the entire range and that one gram mol of the compound sequesters at least three gram atoms of iron at pH values between 6 and about 10.

EXAMPLE III

The cooled reaction flask of Example I is charged with 74 grams (1 mol) of glyoxylic acid (HCO.COOH) and 145 grams of PCl₃ is added with agitation and cooling below 35° C. After reaction is complete there is added 3 gram mols of glacial acetic acid and the mixture allowed to stand overnight. It is then drowned in ice water, evaporated on the steam bath and dried three days in a desiccator. The resulting compound is 1-carboxy-1-hydroxymethylphosphonic acid of the formula

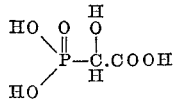

When 5 parts per million of ferric iron is added to water containing 5 parts per million of 1-carboxy-1-hydroxymethylphosphonic acid as described in Example I, the compound proves to be a good sequestering agent.

EXAMPLE IV

Fifty milligrams of trisodium 1-carboxy-1-hydroxyethylphosphonic acid is dissolved in 500 milliliters of water. The pH is adjusted with caustic to 9. A standardized solution of a metal salt is titrated into the alkaline solution, whose pH is held at 9 by the concurrent addition of base. During the titration, small aliquots are examined. The amount sequestered is equal to the sample containing the largest amount of metal without precipitation. The following results are achieved:

Table I

| Metal | Metal sequestered (in milligrams) per 50 milligrams of sequestrant |
| --- | --- |
| Cu⁺² | 88 |
| Co⁺² | 55 |
| Fe⁺³ | 58 |
| Mn⁺² | 39 |
| Ni⁺² | 49 |

EXAMPLE V

Following the procedure of Example I, 1-carboxy-1-hydroxyisobutylphosphonic acid is prepared from dimethyl pyroracemic acid and a slight excess of PCl₃. When added to acidified water containing dissolved iron it prevents the precipitation of ferric hydroxide when a sample is stored for two days in contact with calcite.

EXAMPLE VI

The -carboxy-1-hydroxyalkylphosphonic acid compounds can also be prepared by heating alpha-ketoaliphatic carboxylic acids or their esters with phosphorous acid. Thus, for example, by heating together equimolecular quantities of H₃PO₃ and ethyl pyroracemate the ethyl ester of 1-carboxy-1-hydroxyethylphosphonic acid is obtained. Similarly, the diethyl ester of 1,3-dicarboxy-1-hydroxypropylphosphonic acid is produced by heating phosphorus acid with diethyl alpha-ketoglutarate. These esters are also water-soluble compounds which sequester dissolved iron, although they are not as efficient for this purpose as are the free acids and their water-soluble salts. However, the esters are readily hydrolyzed to the free acids; in fact, this hydrolysis takes place to a considerable extent when the keto-acid esters are heated with phosphorous acid in the presence of water, as when aqueous phosphorous is used. It will be understood, therefore, that the procedure described is a convenient alternative method for preparing the acids as well as their esters.

The 1-carboxy-1-hydroxyalkylphosphonic acids can also be prepared by heating the alpha-keto acids with water-soluble salts of phosphorous acid, such as the alkali metal or ammonium salts, with disodium hydrogen phosphite, preferably in aqueous solution. The corresponding water-soluble salts of the keto acids can also be reacted with phosphorous acid.

While the activity of the sequestrants contemplated herein with respect to a number of heavy metals has been demonstrated hereinabove, the invention is by no means limited thereto. The sequestrants of the instant discovery are useful in sequestering all heavy metal cations which at a pH of 6 to 11 form insoluble precipitates, such as hydroxides and the like, in aqueous media.

Other heavy metal ions sequestered by the 1-carboxy- 1-hydroxy aliphatic phosphonic acids and their water-soluble salts in the manner described in the above examples are lead, titanium, chromium, and the like.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A method of inhibiting the precipitation of heavy metal cations from an aqueous solution containing said cations which comprises incorporating therein heavy metal cation-sequestering quantities of a sequestrant selected from the group consisting of phosphonic acids of the formula

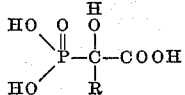

in which R is a member of the group consisting of hydrogen and the residue of an alpha-ketocarboxylic acid of from one to 20 carbon atoms, and alkali metal and ammonium salts of said phosphonic acids.

2. A method of inhibiting the precipitation of heavy metal cations from an aqueous solution having a pH within the range of 6 to 11 and containing said cations, said cations having a tendency to form insoluble precipitates, which comprises incorporating therein in a quantity of at least one gram mol for each three gram atoms of heavy metal cation in said solution a sequestrant selected from the group consisting of phosphonic acids of the formula

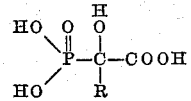

in which R is a member of the group consisting of hydrogen and the residue of an alpha-ketocarboxylic acid of from one to 20 carbon atoms, and alkali metal and ammonium salts of said phosphonic acids.

3. The method of claim 2 wherein the heavy metal cation is iron.

4. The method of claim 2 wherein the heavy metal cation is nickel.

5. The method of claim 2 wherein the heavy metal cation is copper.

6. The method of claim 2 wherein the phosphonic acid is 1-carboxy-1-hydroxyethylphosphonic acid.

7. The method of claim 2 wherein the phosphonic acid is 1-carboxy-1-hydroxymethylphosphonic acid.

8. A method for the secondary recovery of petroleum from a subterranean oil-bearing formation which comprises forcing through said formation toward an output well located therein an aqueous flooding liquid contaminated by small quantities of dissolved heavy metal cations which have a tendency to form insoluble precipitates and also containing, in metal cation-sequestering amounts, a sequestrant selected from the group consisting of phosphonic acids of the formula

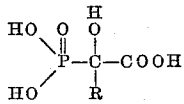

in which R is a member of the group consisting of hydrogen and the residue of an alpha-ketocarboxylic acid of from one to 20 carbon atoms, and alkali metal and ammonium salts of said phosphonic acids.

9. A method of inhibiting the precipitation of iron from petroleum production waters which comprises incorporating therein sequestering quantities of a sequestrant selected from the group consisting of phosphonic acids of the formula

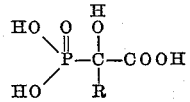

in which R is a member of the group consisting of hydrogen and the residue of an alpha-ketocarboxylic acid of from one to 20 carbon atoms, and alkali metal and ammonium salts of said phosphonic acids.

References Cited in the file of this patent

UNITED STATES PATENTS

| | | |
|---|---|---|
| 2,128,161 | Morgan | Aug. 23, 1938 |
| 2,246,726 | Garrison | June 24, 1941 |
| 2,852,077 | Cocks | Sept. 16, 1958 |
| 2,845,454 | Buckler et al. | July 29, 1958 |